United States Patent [19]
Johnson et al.

[11] 4,220,345
[45] Sep. 2, 1980

[54] PICNIC BASKET ON ROLLERS

[76] Inventors: Clarine Johnson, c/o George Spectro, 3615 Woolworth Bldg, 233 Broadway; George Spector, 3615 Woolworth Bldg., 233 Broadway, both of, New York, N.Y. 10007

[21] Appl. No.: 744,248

[22] Filed: Nov. 23, 1976

[51] Int. Cl.² .............................................. B62B 3/02
[52] U.S. Cl. .................................................. 280/43.16
[58] Field of Search ...................... 254/124, 8 C, 8 R; 280/43.16, 43.13, 43.14, 43.15; 214/512; 312/272, 272.5

[56] References Cited
U.S. PATENT DOCUMENTS

| | | | |
|---|---|---|---|
| 1,139,313 | 5/1915 | Stevens | 312/272 X |
| 1,355,039 | 10/1920 | Gibson | 280/43.16 |
| 2,491,953 | 12/1949 | Coats | 280/43.16 |
| 2,495,046 | 1/1950 | Wolters | 254/8 C |
| 3,431,040 | 3/1959 | Phelps et al. | 312/272 |
| 3,904,853 | 9/1975 | Shoup | 312/272.5 X |

*Primary Examiner*—John A. Pekar

[57] ABSTRACT

A novel cart for household use, and which consists of a strong wire-mesh basket supported upon a pair of front wheels and a pair of rear wheels, a U-shaped push handle being secured to opposite sides of the basket, and a strong wire-mesh lid that can be locked on the basket. A modified version of the cart includes a basket which can be selectively raised upwardly. Another modified version of the cart includes an endless tread powered by an electric motor for climbing obstacles such as curbs and stairs.

1 Claim, 5 Drawing Figures

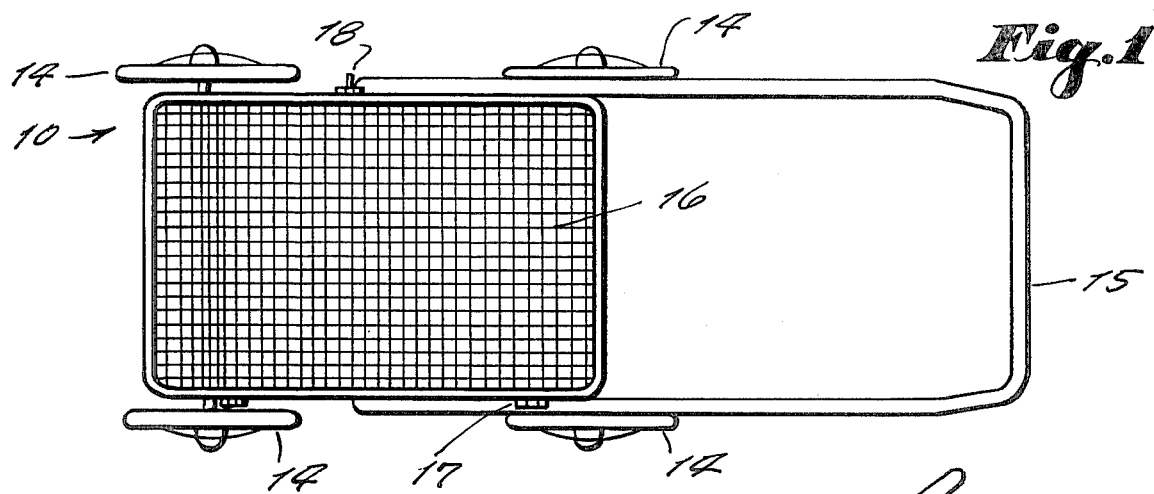
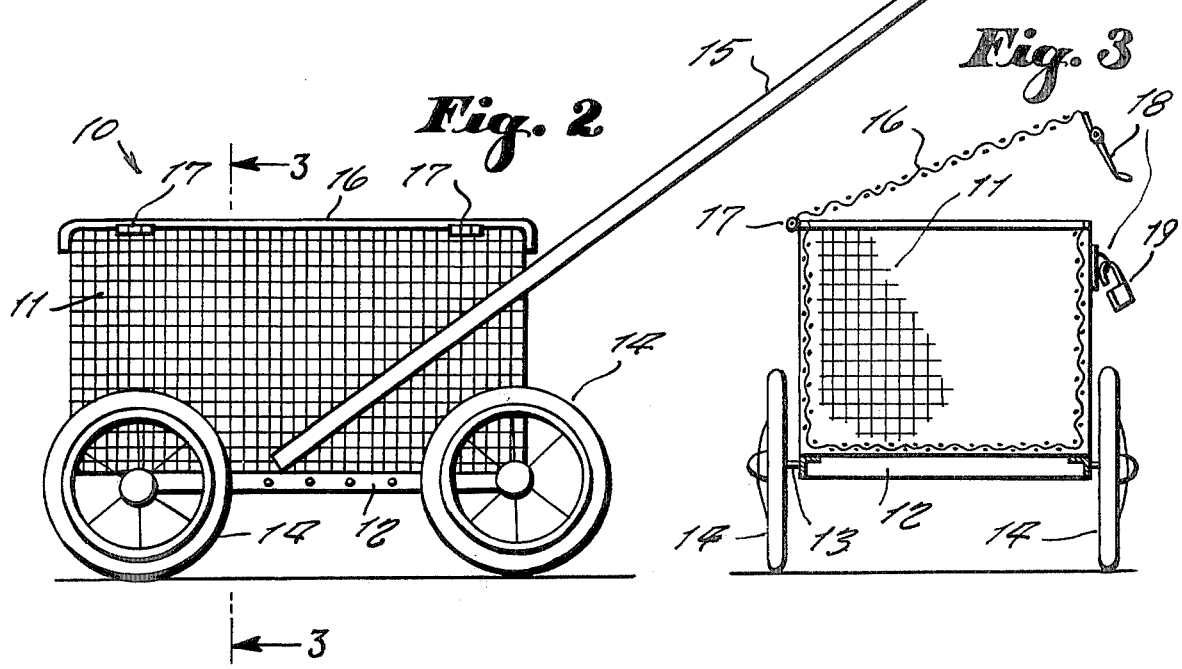
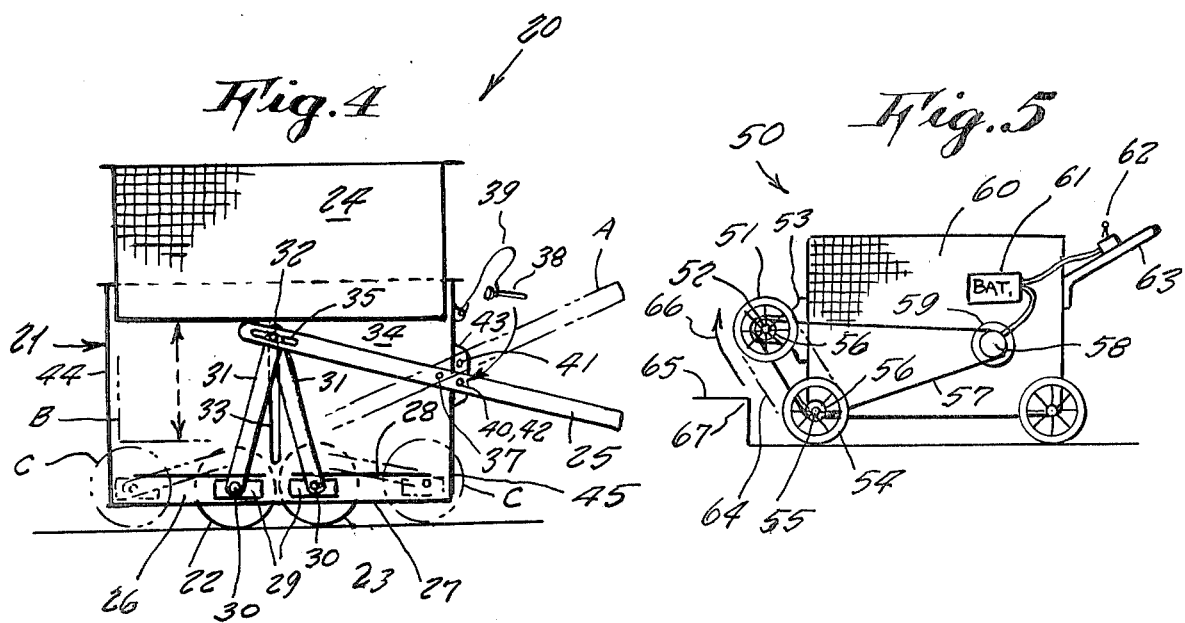

PICNIC BASKET ON ROLLERS

This invention relates generally to household carts.

A principle object of the present invention is to provide a cart having a wire mesh body that is particularly adaptable for various household chores such as carrying laundry or carrying shopping from a store, or which, otherwise, can be used on a picnic or the like.

Another object is to provide a picnic basket on rollers which accordingly eliminates need for persons to carry heavy picnic baskets, camping gear and cooking utensils, all of which can neatly fit into the cart.

Yet another object is to provide a picnic basket on rollers which in one design thereof causes the basket to be upwardly raised when a person depresses the cart handle, so that the person can more conveniently reach down into the basket without need to stoop down, such as for example when unloading laundry at a washing machine; and when the basket is thus raised, the front and rear wheels of the cart are slid towards each other automatically so that the cart is then able to more easily make sharp turns and maneuver into position alongside a washing machine or the like.

Other objects are to provide a picnic basket on rollers which is simple in design, inexpensive to manufacture, rugged in construction, easy to use and efficient in operation.

These and other objects will be readily evident upon a study of the following specification and the accompanying drawings wherein:

FIG. 1 is a top view of the invention.

FIG. 2 is a side view thereof.

FIG. 3 is a cross sectional view taken on line 3—3 of FIG. 2.

FIG. 4 is a side cross sectional view shown diagrammatically, and illustrating a modified design of the invention in which the basket can be selectively raised upwardly so to eliminate need for a person to bend down as far when items are intended to be removed therefrom; the wheels at such time being automatically brough closer together so that the cart can thus be more maneuverable in turning in order to be placable near any spot where items can be transferred between the spot and the cart.

FIG. 5 is a side view of another modified design of the invention wherein an electric motor aids in moving the cart horizontally or in climbing a street curb or a stair step.

Referring now to the drawing in detail, and more particularly to FIGS. 1 to 3 thereof at this time, the reference numeral 10 represents a cart according to the present invention wherein there is a rectangular basket 11 made of a strong wire-mesh secured upon a frame 12 fitted with front and rear axles 13 mounted with wheels 14.

A U-shaped handle 15 is secured to opposite side walls of the basket 11 for purpose of pushing the cart.

A lid 16 is fitted on top of a mouth of the basket, and is secured pivotally thereto by means of hinges 17 and can be securely locked by means of a hasp 18 that can receive a lock 19, or it may be simply held closed by a simple latch (not shown).

In operative use, it is now evident that a handly cart is thus produced and which is suitable for doing various chores.

Refering now to FIG. 4 of the drawing; a modified design of the invention shows a cart 20 wherein a cart frame 21 is supported upon a pair of front wheels 22 and a pair of rear wheels 23; the frame supporting a basket 24, and a cart including a pivotable handle 25 so to cause the bracket to be raised and the front and rear wheels moved closer together automatically at a same time.

In this design, the frame 21 includes a horizontal channel 26 formed between frame bottom wall 27 and a horizontal partition 28. A pair of sliding blocks 29 are slidable forwardly or rearwardly in the channel, each block carrying an axle 30 on which the wheels are rotatably mounted. One end of a pair of rods 31 are pivotally mounted at each end of the axles, each pair of rods at their upper end being pivotally attached to a cross-pin 32 which travels in a vertical slot 33 on a side wall 34 of the frame and which also travels in a slot 35 formed in an end of the U-shaped handle 25 that extends around a rear end of the basket, the handle being pivotable about a stationary pivot pin 37.

When the handle is pivoted in the position shown by the dot-dash lines A the basket is in a downward position as shown by dot-dash lines B, and the wheels are in spread apart position as shown by dot-dash lines C. However, when the handle is downward pivoted by hand, the basket is raised and wheels are brought close together as all shown by the solid lines. The handle is retained in lowered or raised position by means of a securement pin 38, attached on a tethering cord 39, the pin 38 being insertable through a hole 40 of the handle and either an upper or lower hole 41 or 42 of a stationary bracket 43 mounted on the frame.

It is to be noted that in this design that the bottom of the basket rests upon the cross-pin 32 when in its lowered or raised position; the basket being maintained upright by being slidably held between the basket front and rear vertical, parallel walls 44 and 45.

In FIG. 5, another modified design of cart 50 includes a pair of auxiliary wheels 51 affixed on an axle 53 supported in brakcets 53 on a front side of the basket. The conventional front wheels 54 of the cart are affixed on an axle 55. Axles 52 and 55 each has a sprocket 56 affixed thereupon engaged by endless chain 57 passed around a sprocket 58 of an electric motor 59 mounted on the basket 60. The motor is powered by replacable batteries 61 in an electric circuit with a switch 62 mounted on handle 63 of the cart. An endless tread 64 may be fitted around the wheels 51 and 54.

In this form of the invention, if a person is pushing a very heavy load, and the cart comes to a street curb or stair step 65, instead of applying physical leverage to the handle, the person simple flips the switch, thus causing the tread to travel in direction as shown by arrow 66, so the tread bearing against the corner 67 of the curb or step causes the front end of the cart to be raised upwardly and climb the same.

Thereafter the switch is then turned off so that the wheels 54 can then freely rotate in an opposite direction, while the cart is being pushed forwardly in its continuing forward travel.

Thus different forms of the invention have been presented, and which serve a useful purpose.

Thus a handy cart has been provided.

While various changes may be made in the detail construction, it is understood that such changes will be within the spirit and scope of the present invention, as is defined by the appended claims.

What is claimed is:

1. A cart having front and rear axles supporting a cart frame, including front and rear wheels mounted on the ends of said axles, including a basket vertically movable mounted in said frame including a rearward extending handle pivotably mounted on said frame, said handle including a forward end engaging said basket for elevating said basket upon pivotal motion of said handle, said axles being slidably mounted on said frame including a second means for moving said axles relative to each other responsive to and coacting with actuation of said forward end of said handle wherein said forward end of said handle engages, the basket bottom and wherein the second said means comprises blocks secured to said axles mounted movably in channels formed on opposite sides of said frame, said forward end and said blocks being pivotably connected to members forming part of said second means whereby vertical movement said handle causes simultaneous movement of the basket and axles.

* * * * *